Figure 8:
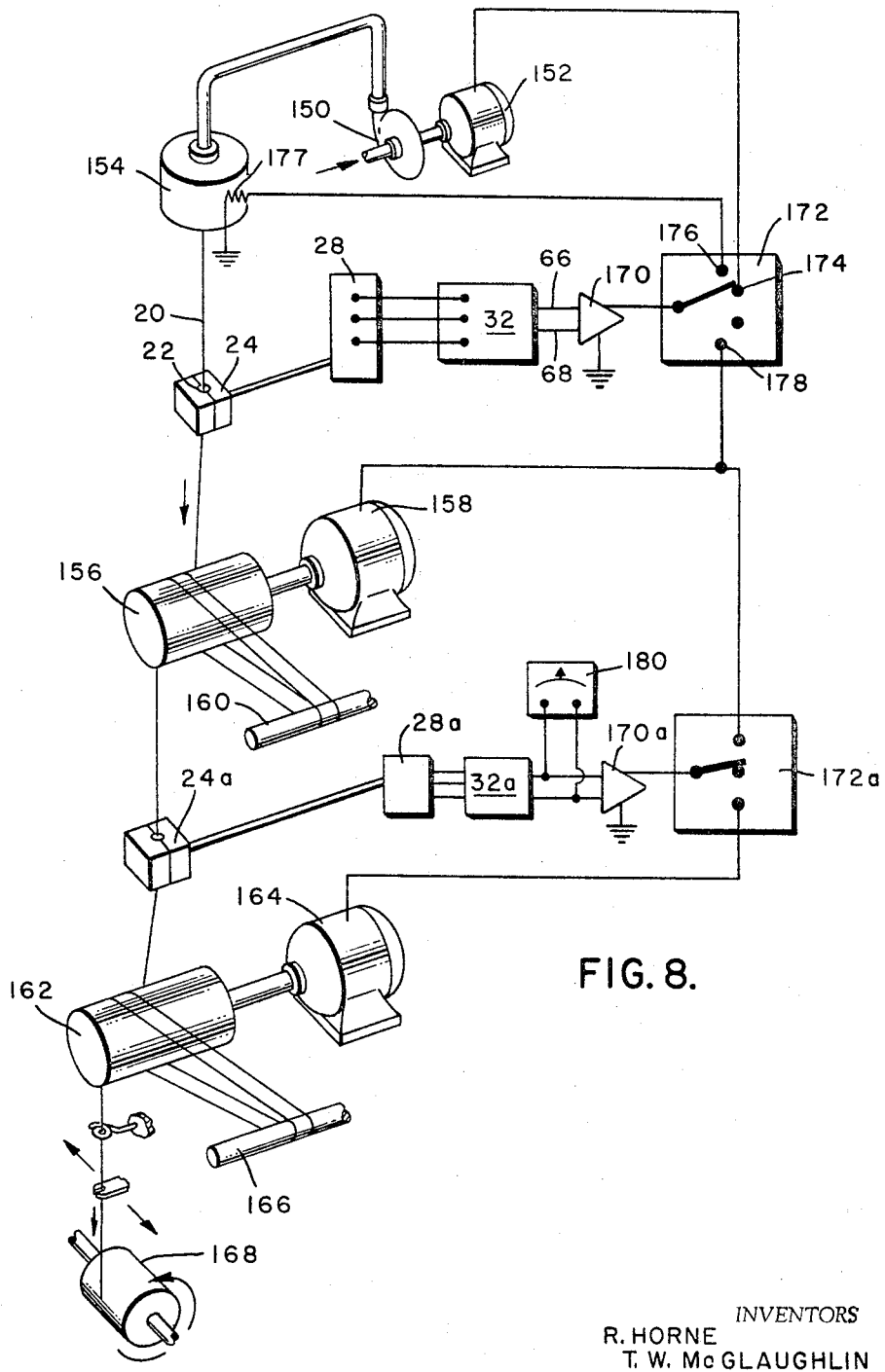

Sept. 13, 1966 R. HORNE ET AL 3,271,997
PNEUMATIC DENIER MONITORING APPARATUS
Filed Jan. 17, 1963 3 Sheets-Sheet 1
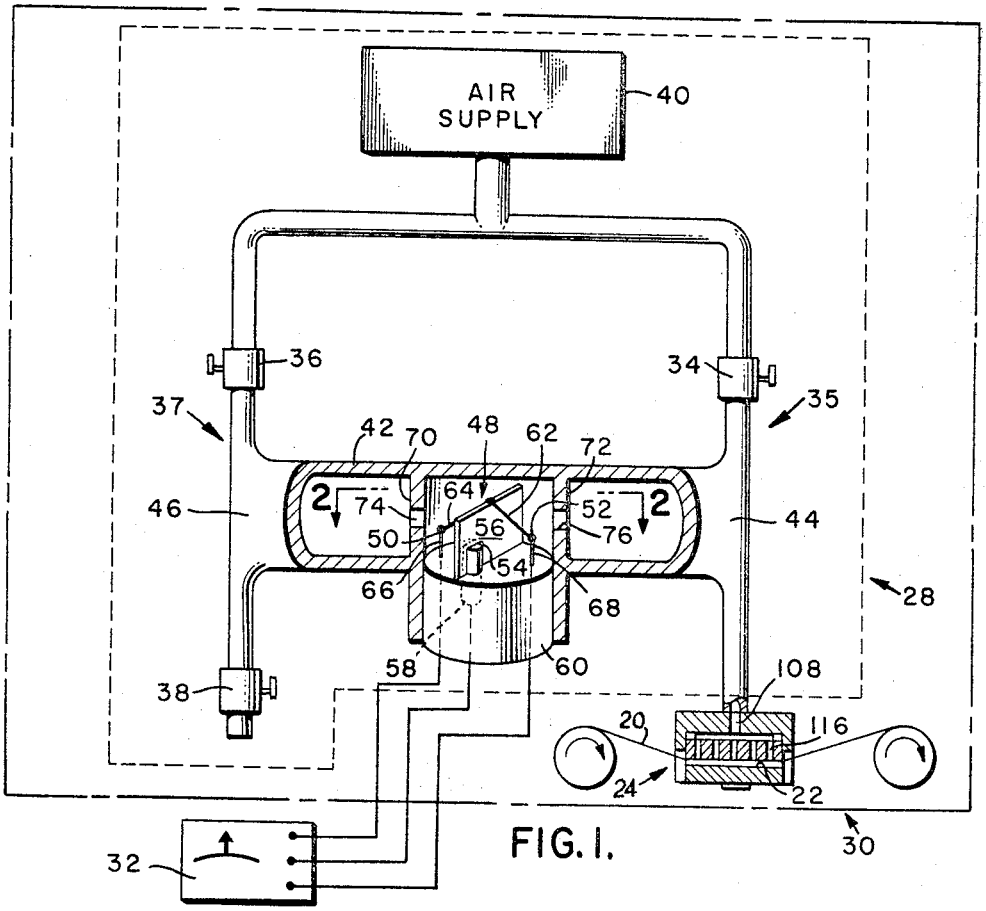
FIG. 1.
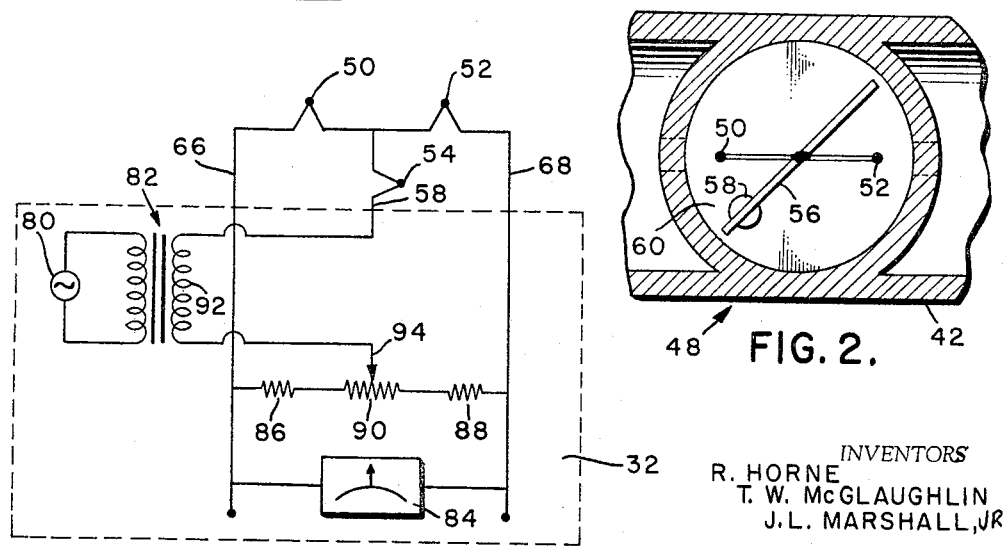
FIG. 2.
FIG. 3.
INVENTORS
R. HORNE
T. W. McGLAUGHLIN
J. L. MARSHALL, JR.
BY Kelly O. Corley
ATTORNEY

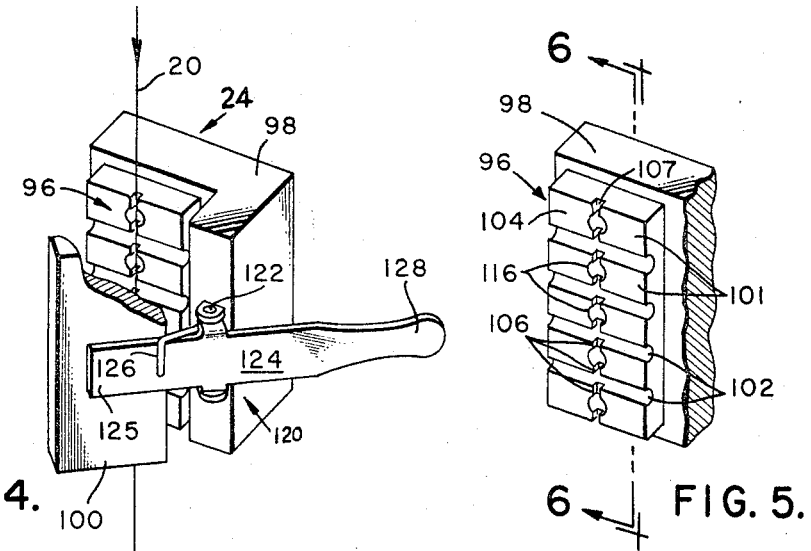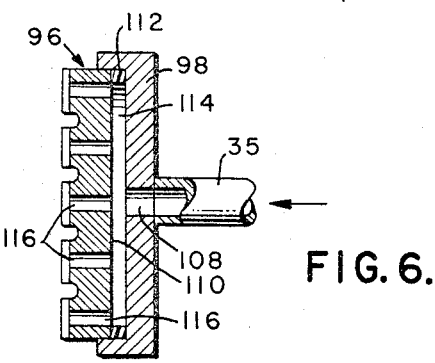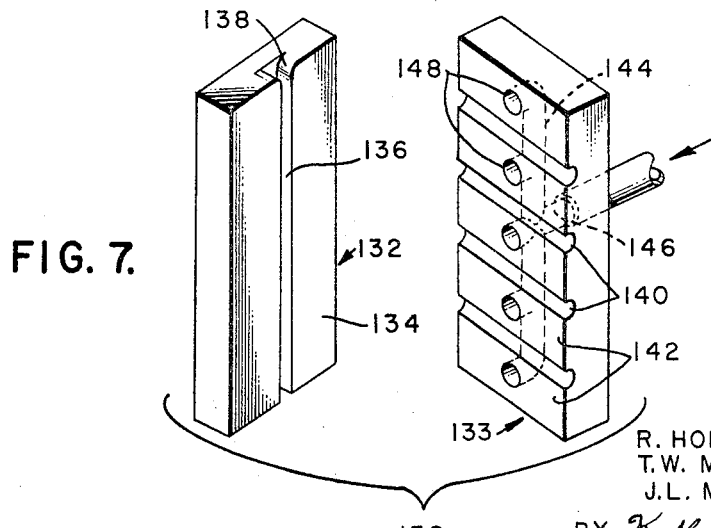

INVENTORS
R. HORNE
T. W. McGLAUGHLIN
J. L. MARSHALL, JR.
BY Kelly D. Corley
ATTORNEY United States Patent Office 3,271,997
Patented Sept. 13, 1966

3,271,997
PNEUMATIC DENIER MONITORING APPARATUS
Ronald Horne and Thomas W. McGlaughlin, Pensacola, Fla., and John L. Marshall, Jr., Flomaton, Ala., assignors to Monsanto Company, a corporation of Delaware
Filed Jan. 17, 1963, Ser. No. 252,143
8 Claims. (Cl. 73—37.7)

The present invention is related to a system and apparatus for continuously measuring the denier of strand-like materials, such as textile filaments, wires, thin films or the like. More particularly, such denier monitoring is attained by providing a pneumatic bridge which is balanced or unbalanced by the thickness of the material being monitored, the unbalance being detected by flow-detection means inserted in one of the bridge diagonals.

Denier measuring has usually been accomplished in the past by manual methods which took the form of stripping off a given length of filament and weighing to determine the denier. Such sampling necessarily involved only a minute portion of the total filament, and was thus inadequate from a precise control standpoint as well as being laborious and expensive. Denier measuring by other than manual means has previously been attempted by capacitive measurements, pneumatic-hydrostatic measurements, or by electro-pneumatic measurements.

The capacitive method was elaborate and expensive, involving fairly complex and sometimes erratic electronic equipment. Such apparatus was usually difficult to calibrate, and the small signals obtained normally required amplification to be useful, which further added to the expense and complexity of the system. The capacitive apparatus furthermore was usually delicate and easily damaged.

The pneumatic-hydrostatic methods provided low sensitivity and were slow in their response to rapidly varying deniers, thus rendering them unsuited for control or indication applications involving high speed handling of the materials being monitored. In addition, since the relative denier was indicated by the height of a water column, to use this method for control purposes would require some sort of transducer to convert the liquid level to a more usable form of signal.

Electro-pneumatic methods of denier monitoring have thus far been unsuccessful due to their lack of sensitivity and slowness of response. As typical of such prior monitoring methods and apparatus, U.S. Patent No. 2,014,998 is directed to an electro-pneumatic monitoring apparatus wherein the resistance of a heated wire is varied by a current of air passing thereover, the air being supplied through a capillary tube through which the threadline is passed. The apparatus thus disclosed suffers from a lack of sensitivity to small variations in denier, and possesses a large thermal lag. In addition, such apparatus is relatively complex and contains a large number of components which must be accurately matched to one another to provide a workable system.

Accordingly, a principal object of the invention is to provide automatic denier control apparatus.

A further object is to provide control apparatus of the above character which incorporates sensitive denier monitoring apparatus.

A further object is to provide denier monitoring apparatus which affords great sensitivity to changes in denier.

A further object is to provide denier monitoring apparatus which incorporates pneumatic multiplication of the effect of a denier change.

A further object is to provide apparatus of the above character which has a rapid response to variations in denier.

A further object is to provide apparatus of the above character which is capable of providing substantial accuracy while using simple apparatus.

A further object is to provide apparatus of the above character which is adapted to be installed on or removed from a moving threadline.

A further object is to provide apparatus of the above character which is flexible and readily adaptable to various control, indicating and the like functions.

A further object is to provide apparatus of the above character which is substantially insensitive to variations in most of the parameters of the system, and which responds primarily only to variations in denier.

Other objects of the invention will in part be obvious and will in part appear hereinafter. The invention accordingly comprises the features of construction, combination of elements and arrangement of parts which will be exemplified in the constructions hereinafter set forth, and scope of the invention will be indicated in the claims. For a more complete understanding of the nature and objects of the invention reference should be had to the following detailed description taken in connection with the accompanying drawings, in which:

FIGURE 1 is a schematic perspective view, partially broken away, of the pneumatic denier monitoring apparatus of the present invention, FIGURE 2 is a sectional view taken along line 2—2 in FIGURE 1, FIGURE 3 is a schematic circuit diagram of the apparatus shown in FIGURE 1, FIGURE 4 is a perspective view of a preferred denier-monitoring orifice block and clamp assembly, FIGURE 5 is a perspective view of a portion of the FIGURE 4 assembly and shows a preferred construction of the monitoring block, FIGURE 6 is a sectional view taken along line 6—6 in FIGURE 5, FIGURE 7 is a perspective view of a second block assembly embodiment, alternative to that illustrated in FIGURES 4–6, FIGURE 8 is a schematic perspective diagram of a spin-draw apparatus incorporating the denier measuring system of the present invention.

Referring now to FIGURE 1, a strand 20 which is to be monitored is fed through an orifice 22 in a monitoring block assembly 24 so as to partially fill or block the orifice. Air is supplied to an intermediate portion of orifice 22 by a passage in block 24 from a pressurized air supply and balancing apparatus 28, which together with block 24 forms a pneumatic bridge 30. Variations in denier of strand 20 cause corresponding variations in airflow in bridge 30. The latter variations are transduced to an electrical signal which is supplied to a suitable indicator or control mechanism 32 in a manner to be more fully disclosed below.

Bridge 30 is formed by block 24 together with three other restricted portions or legs, illustrated as adjustable valves 34, 36 and 38, arranged in two paths between a pressurized air source 40 and the atmosphere. Thus, air from supply 40 flows serially through valve 34 and through block 24 to discharge to the atmosphere to form a first or monitoring path 35, and serially through valves 36 and 38 to discharge to the atmosphere to form a second or reference path 37. A balance-sensing tube 42 connects an intermediate region 44 in the monitoring path 35 with intermediate region 46 in the reference path 37, and contains a sensitive airflow detector assembly 48 which detects the degree and direction of unbalance.

Referring now to FIGURES 1 and 2, in a preferred embodiment of the invention airflow detector 48 comprises a pair of spaced heated thermocouple junctions 50 and 52 and a cold thermocouple junction 54. Thus, a baffle plate 56 formed of a first metal has a first or lower edge welded to a short rod 58 of a second metal to form therewith cold thermocouple junction 54. Rod 58 extends through an insulating plug 60 and supports plate 56 at a 45° angle to the axis of tube 42. Fine metallic wires or conductors 62 and 64 of the same metal as plate 56 are welded to the opposite or upper edge of plate 56, and extend diagonally downwardly on opposite sides of plate 56. A first fine wire 66 of the same metal as rod 58 extends through plug 60 and is joined to wire 64 to form junction 50, while a second fine wire 68 of the same metal as rod 58 extends through plug 60 and is joined to wire 62 to form junction 52.

A pair of transverse walls 70 and 72 in tube 42 are provided with apertures 74 and 76, which apertures are aligned with and closely adjacent to heated junctions 50 and 52 in order to increase the velocity of airflow across the heated thermocouple junctions due to airflow in tube 42. Since plate 56 extends at a 45° angle to the axis of tube 42 (see FIGURE 2), the heated thermocouple junctions 50 and 52 will be differentially shielded according to the direction of airflow in tube 42. Accordingly, as air flows in tube 42 from monitoring path 35 to reference path 37, thermocouple 52 will be cooled to a greater extent than thermocouple 50 since thermocouple 52 is directly exposed to the airflow through orifice 76 while thermocouple 50 will be partially shielded from such airflow by baffle plate 56. Conversely, airflow in the opposite direction results in thermocouple 50 being cooled more than thermocouple 52. This differential cooling of one or the other of thermocouples 50 and 52 is used to detect the amount and direction of variation in denier of yarn 20 either above or below a control denier.

Referring now to FIGURE 3, there is shown an electrical circuit diagram of an exemplary control mechanism 32 which may be used in the FIGURE 1 denier monitoring system. As shown therein, alternating current for heating the heated junctions 50 and 52 is supplied from a source 80 through a suitable transformer 82. A suitable load device (illustrated as a meter 84) is connected directly across conductors 66 and 68. A pair of resistors 86 and 88 and a potentiometer 90 are connected in series and shunted across load 84. Secondary winding 92 of transformer 82 is connected between potentiometer tap 94 and rod 58, and is thus connected between tap 94 and cold junction 54.

In the circuit as thus constituted, thermocouple junctions 50 and 52 are heated by alternating current from secondary winding 92, while load device 84 is isolated from such alternating current when tap 94 is properly adjusted. Alternating current from the upper side of secondary winding 92 flows through thermocouple junction 54. A portion of such alternating current then flows through a first circuit including hot thermocouple junction 50, conductor 66, resistor 86, part of potentiometer 90 to tap 94 and thence back to the lower side of secondary winding 92. The remainder of the alternating current flowing through thermocouple junction 54 flows through the other thermocouple junction 52, conductor 68, resistor 88, the other portion of potentiometer 90, and by way of tap 94 to the lower side of secondary winding 92. This alternating current is sufficient in magnitude to heat junctions 50 and 52 to a suitable high temperature by the power dissipated across their internal impedance. However, since cold thermocouple junction 54 is constituted by the relatively massive rod 58 and baffle plate 56, the impedance of junction 54 is considerably lower than the impedances of junctions 50 and 52, and accordingly junction 54 remains relatively cool as compared to junctions 50 and 52.

In the illustrated circuit each hot thermocouple junction produces an output signal with respect to the rod 58 proportional to the temperature difference between itself and junction 54. Load device 84 is connected directly across conductors 66 and 68 to detect any unbalance between the output signals of heated thermocouples 50 and 52, and so long as junctions 50 and 52 are at the same temperature, there will be no output signal to actuate device 84. If, however, one of the junctions 50 or 52 is cooled to a greater extent than the other junction, an unbalanced signal will be produced to actuate load device 84.

Thus, referring to FIGURES 1, 2 and 3, bridge 30 may be balanced with a strand 20 of a given control denier in orifice 22 by adjustment of valves 34, 36 and 38 until no air flows in tube 42. If the denier of strand 20 then increases, the strand will more nearly fill orifice 22 and will reduce the amount of air flowing in the monitoring path 35. This will cause an air current to flow in tube 42 from monitoring path 35 to reference path 37. The air current will pass through orifice 76 and impinge on and cool thermocouple 52. Due to the 45° orientation of baffle plate 56, this air current will be deflected from junction 50, and will not produce the same cooling effect on junction 50 as is produced on junction 52. Referring to FIGURE 3, since junction 52 is cooled to a greater extent than junction 50, the output voltage on conductor 68 will decrease, destroying the balanced condition previously existing. Since the output signal on conductor 66 is now larger than the output signal on conductor 68, an error signal is developed to actuate load device 84.

Of course, it will be understood that if the denier of yarn 20 decreases, the direction of airflow in tube 42 will be reversed and junction 50 will be cooled to a greater extent than junction 52, yielding an error signal on conductor 68 and reversing the flow of current in load 84.

Referring now to FIGURES 4 through 6, a preferred exemplary form of orifice block assembly 24 is illustrated, which provides fivefold pneumatic amplification of the air current in tube 42. Block assembly 24 includes a grooved block 96 of a hard material such as tungsten carbide partially recessed in a housing 98, which may be of a softer material such as brass, together with a mating cover plate 100 of the hard material. Block 96 is divided into five integral sections 101 by four transverse relief channels 102 formed in the free surface 104 of block 96. A series of axially aligned grooves 106 are formed in the free surface 104 of block 96, each extending across one of the sections 101. Preferably, the end 107 of the slot 106 at which the threadline enters is widened to provide guiding means to facilitate entry of the threadline into slots 106.

As shown in FIGURES 5 and 6, air is admitted to the center of each of the grooves 106 by suitable air passages in block 96 and housing 98. Thus, an aperture 108 in housing 98 connects monitoring path 35 to the inner surface 110 of block 96. A gasket 112 seals the perimeter of surface 110 to housing 98, thus forming with housing 98 and block 96 a distribution gallery or chamber 114 extending over the major length of block 96. An air passage 116 connects each of the slots 106 to the gallery.

Referring to FIGURE 4, cover plate 100 has a lapped planar surface mating with surface 104 and spanning the grooves 106 to form therewith a series of aligned restricted passageways or orifices, through which the threadline 20 is passed. Thus, orifice 22 actually comprises five aligned orifices through which the threadline is passed with each of the orifices being supplied with air from a common air source. Any variations in airflow in orifices 106 thus are cumulative in their effect on detector assembly 48. It is particularly noted that the present invention is not restricted to fivefold pneumatic amplification, such being chosen merely for exemplary purposes. Thus, any number of aligned orifices may be provided to yield the desired amplification.

A suitable quick acting clamp mechanism 120 holds cover plate 100 in sealing contact with surface 104 after threadline 20 is inserted in grooves 106, while permitting ready separation of plate 100 from surface 104. Thus, a pin 122 is mounted on housing 98 parallel to the axes of grooves 106. An intermediate portion of a rigid lever 124 is pivotally mounted on pin 122 and has cover plate 100 mounted on the left end 125 thereof as viewed in FIGURE 4. A spring 126 mounted on pin 122 and engaging end 125 resiliently urges plate 100 into sealing contact with surface 104. The opposite end 128 of lever 124 forms a handle, by means of which lever 124 may be rotated about pin 122 against the urging of spring 126 sufficiently to give access to block 96 and plate 100, as illustrated.

It has been discovered that, for optimum sensitivity to denier variations and for trouble-free performance, the unoccupied cross-sectional area of the passageway should be no greater than 12 times the cross-sectional area of the strand, and preferably is from ⅓ to 4 times the strand cross-sectional area. The dimensions of air supply passages 116 and vent or relief channels 102 are not critical, so long as they are several times the size of grooves 106. By way of specific example, slots 106 may be .004 inch wide, .008 inch deep, and may extend about 3/32 of an inch on each side of each passage 116, when monitoring a threadline of nominally 115 denier and 13 filaments. With this block 24 incorporated in the FIGURE 1 system, strand 20 was fed through orifice 22 under constant tension at a speed of approximately 100 feet per minute using a nominal air pressure from supply 40 of about 30 pounds per square inch. With the bridge 30 balanced and having approximately 20 pounds per square inch pressure on block assembly 24, and using commercially available thermocouple junctions (type K), a one denier change produced an error signal of .25 millivolt.

It has been found that the accuracy of such indications is substantially unaffected by wide variations in air supply pressure, although sensitivity increases somewhat with higher pressures. The measurement accuracy is not restricted to a particular speed of strand 20 through orifice 22 since variations in strand speed over several orders of magnitude did not significantly affect the accuracy achieved. For maximum sensitivity the resistance offered to airflow by each of the restrictions 34 and 36 should be equal to twice the resistance offered by restriction 38 and by orifice 32 with a strand 20 of the control denier in the orifice.

It should be particularly noted that the segmental construction of orifice block assembly 24 has several distinct advantages. Since a typical block 96 will have an axial length of a substantial portion of an inch or more, in order to accommodate several stages, and is formed of a very hard material in order to withstand the abrasive action of rapidly moving strands, it is extremely difficult to machine to the required tolerances from a solid block. Thus it would be excessively expensive and tedious to form a passage .004 inch by .008 inch to a depth of an inch or more in a solid block, as would be necessary if a split or segmental construction were not utilized. Furthermore, it would be virtually impossible to perform inspection and finishing operations such as electro-polishing, electro-plating, etc., uniformly throughout the depth of such a slot formed in a solid block. In contrast, the present construction permits ready access throughout the entire extent of slots 106, both while the slots are being formed initially, and later for cleaning, inspection, or repair. Furthermore, the present split construction greatly facilitates stringup of a rapidly moving continuous threadline into the orifice, a process which would be virtually impossible without a split construction. The split head permits the construction of a portable denier monitoring instrument which may be installed or removed without interrupting a continuous moving threadline. The provision of the several slots 106, axially aligned on a single block 96, insures precise alignment of these slots, which would not otherwise be readily attainable if a series of physically separate monitoring blocks were assembled.

Referring now to FIGURE 7, there is shown a block and plate which is alternative to the construction illustrated in FIGURES 4 to 6. The embodiment illustrated in FIGURE 7 is specifically designed to minimize machining in the extremely hard materials which are necessary to withstand constant abrasion as by rapidly moving nylon strands. As illustrated, a block 132 of a suitable hard material such as tungsten carbide together with a mating cover plate 133 may be assembled to form the plurality of orifices. Block 132 has formed in one planar face 134 a longitudinally extending groove 136, which is widened at the threadline entry end 138 to facilitate entry of the threadline during the stringup operation. Plate 133 has a plurality of transverse channels 140 formed in a planar face thereon, thus providing a plurality of coplanar segments 142. An air distribution gallery 144 (shown in dotted lines) extends longitudinally in plate 133, and distributes air from a common supply line 146 through individual passages 148 to the center of each segment 142. When plate 133 is assembled with segments 142 pressed into contact with surface 134, air is supplied from intermediate region 44 (FIGURE 1) through passages 148 to groove 136, and is vented to the atmosphere from slot 136 at the several channels 140.

Since the air is now supplied from plate 133, the theadline is urged by the air pressure to the bottom of groove 136 and away from the surfaces of segments 142, thus greatly reducing the tendency of the rapidly moving strands to wear away portions of plate 133. This construction permits plate 133 to be made of a much softer material, and thus most of the machining and removal of large portions of material may be done in a softer material than that which is required for block 132.

Referring now to FIGURE 8, there is shown a spin-draw system incorporating denier monitoring controls according to the present invention. As shown therein, a melted polymer is supplied by a pump 150 driven by motor 152 to a heated spinneret 154, wherein the polymer is extruded to form strand 20. Strand 20 upon solidification passes around a feed roll 156 driven by motor 158, with a separator roll 160 cooperating with feed roll 156 to maintain the several turns of strands 20 separated. After leaving feed roll 156, strand 20 next passes about a draw roll 162, which is driven at a higher peripheral velocity than feed roll 156 by motor 164. This draws strand 20, as will be apparent to those skilled in the art, with feed roll 156 acting as a brake mechanism. A conventional draw separator roll 166 is likewise provided to maintain the several wraps separated on draw roll 162. Strand 20 is then taken up by suitable winding or take-up mechanism 168.

The denier monitoring apparatus as above described may be incorporated in the above system at any of several points. Preferably, assembly 24 is positioned between spinneret 154 and feed roll 156, at a point where the strand 20 has become solidified. The denier of the solidified strand 20 which is fed to the feed roll 156 is determined by several factors, including the pressure of pump 150, the viscosity of the polymer being extruded, and the peripheral velocity of feed roll 156. Any of these factors may be automatically controlled in response to the denier monitoring apparatus shown in FIGURE 1, as illustrated in FIGURE 8. As shown therein, strand 20 passes through orifice 22 in assembly 24 after the strand has solidified and before it reaches feed roll 156. The error signal on conductors 66 and 68 is amplified as necessary in amplifier 170. A control system 172, schematically illustrated as a multi-position selector switch, selectively connects the amplified error signal to one of three terminals, 174, 176 or 178. In the position illustrated, the error output signal is connected to terminal 174 and is thus used to control the rotational speed of motor 152 and thus the output pressure of pump 150, in order to control the amount of polymer extruded per period of time.

Alternatively switch 172 may be actuated so that the control output signal of control mechanism 32 is connected through contact 176 to suitable heating coils 177 in spinneret 154 which control the temperature and thus the viscosity of the polymer being extruded. Likewise this control may be so varied as to maintain the denier of strand 20 substantially constant. A further alternative control of the denier is provided when the control output signal of control mechanism 32 is connected by contact 178 to control the speed of feed motor 158. It will be apparent to those skilled in the art that control system 172 may incorporate suitable circuitry for so controlling one of motors 152 and 158 or the heater as to maintain the denier of strand 20 substantially constant, while operating the others at a constant rate.

Still referring to FIGURE 8, a monitoring block 24a may be mounted to monitor strand 20 between the feed roll 156 and the draw roll 162 so as to monitor the filament after the drawing operation. The error signal resulting from the denier measurement at this point preferably may be connected by a suitable control system (schematically illustrated as a selector switch) to control the rotational speed of feed motor 158 or may be connected to control the rotational speed of draw motor 164.

The unamplified error signal developed in control mechanisms 32 or 32a may be displayed on a suitable display device such as meter 84 without amplification, or may be used to operate a simple sensitive relay to shut down the process or give a suitable alarm if the denier varies a given amount from the desired control denier, either as a supplement to instead of being amplified and used to control the process. A further application is actuation of a counter mechanism 180 (see FIGURE 8) with the error signal, thereby providing a record of the number of deviations from standard denier which occur along the strand. This may be used as a slub counter or defect counter to indicate the quality of the strand.

It should be clearly understood that while the above description for the sake of simplicity has referred to air supply 40 as a source of air at a pressure above atmospheric pressure, the invention is not so limited. Thus, supply 40 may contain other gases than those normally found in the atmosphere, or may actually be a vacuum source, such as a vacuum pump. However, ordinary compressed air is entirely satisfactory and is preferred.

Accordingly, there has been disclosed a denier monitoring and control apparatus which provides accurate control of the strand denier. The several disclosed locations for monitoring denier afford great flexibility in adapting present filament spinning apparatus to incorporate the present monitoring and control system. Since the airflow detection means according to the preferred embodiment of the present invention utilizes extremely fine thermocouples having low heat capacity, thermal lag is substantially reduced as compared to conventional prior art approaches to the problem, thus affording great accuracy combined with a rapid response to variations in denier. The provision of a pneumatic bridge permits the use of relatively simple electrical circuitry of great accuracy, in which very little, if any, matching of components is required. Furthermore, the circuitry disclosed provides a null output when the monitored denier is the same as the control denier, and provides an output error signal which indicates in polarity and magnitude the direction and amount of variation of the monitored denier from the control denier. The pneumatic bridge arrangement renders the monitoring apparatus substantially insensitive to variations in air supply pressure over a wide range, and the apparatus is insensitive to variations in strand speed through the monitoring orifice. Thus the disclosed denier monitoring apparatus responds primarily only to variations in the parameter being measured, i.e., only to denier variations.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for monitoring the denier of an elongated strand comprising in combination:
   (a) a source of air at a pressure different from atmospheric,
   (b) an airflow measuring device having an input side connected to said source and having an output side,
   (c) and a monitoring head assembly, said head assembly comprising:
      (1) means having a plurality of axially aligned grooves in a surface, said grooves being separated by transverse air passages vented to the atmosphere,
      (2) a removable cover plate mating with said surface and spanning said grooves to form therewith a series of aligned restricted passageways for receiving said strand,
      (3) and an air passage connecting an intermediate portion of each of said passageways with said output side whereby air flows from said flow monitoring device through said passageways in parallel.

2. Apparatus for monitoring the denier of a strand, comprising in combination:
   (a) a first air passage connecting two points of different pneumatic pressures, said first air passage comprising:
      (1) a first constricted portion,
      (2) a second constricted portion including a monitoring orifice assembly, said assembly comprising:
         (a) means having a plurality of axially aligned grooves in a surface, said grooves being separated by transverse air passages vented to the atmosphere,
         (b) a removable cover plate mating with said surface and spanning said grooves to form therewith a series of aligned restricted passageways for receiving said strand,
         (c) and an air passage connecting an intermediate portion of each of said passageways with said output side whereby air flows from said flow monitoring device through said passageways in parallel,
      (3) and an intermediate region between said first constricted portion and said orifice,
   (b) a second air passage connecting said two points, said second air passage comprising:
      (1) third and fourth constricted portions,
      (2) and an intermediate region between said third and fourth constricted portions,
   (c) a metering passage connecting said intermediate regions,
   (d) airflow detection means within said metering passage for detecting variations in air flow therein,
   (e) and means for feeding said strand through said series of aligned passageways, whereby variations in denier of said strand vary the effective size of said monitoring orifice and induce variations in airflow in said metering passage.

3. Apparatus for monitoring the denier of an elongated strand comprising in combination:
   (a) a source of air at a pressure different from atmospheric pressure,
   (b) an airflow measuring device having an input side connected to said source and having an output side,
   (c) and a monitoring head assembly, said head assembly comprising:
      (1) a first member having a first surface,
      (2) means defining a groove in said surface,
      (3) a removable cover member having a second surface mating with said first surface and spanning said groove to form therewith a restricted passageway for receiving said strand,
      (4) a plurality of air supply passages connecting spaced points along said passageway in common to said output side,
      (5) and vent passages connecting to the atmosphere intermediate portions of said passageway between each adjacent pair of supply passages.

4. Apparatus for monitoring the denier of a strand, comprising in combination:
   (a) a first air passage connecting two points of different pneumatic pressures, said first air passage comprising:
      (1) a first constricted portion,
      (2) a second constricted portion including a monitoring orifice assembly, said assembly comprising:
         (a) a first member having a first surface,
         (b) means defining a groove in said surface,
         (c) a removable cover member having a second surface mating with said first surface and spanning said groove to form therewith a restricted passageway for receiving said strand,
         (d) a plurality of air supply passages connecting spaced points along said passageway in common to said output side,
         (e) and vent passages connecting to the atmosphere intermediate portions of said passageway between each adjacent pair of supply passages,
      (3) and an intermediate region between said first constricted portion and said orifice,
   (b) a second air passage connecting said two points, said second air passage comprising:
      (1) third and fourth constricted portions,
      (2) and an intermediate region between said third and fourth constricted portions,
   (c) a metering passage connecting said intermediate regions,
   (d) airflow detection means within said metering passage for detecting variations in airflow therein,
   (e) and means for feeding said strand through said retricted passageway, whereby variations in denier of said strand vary the effective size of said monitoring orifice and induce variations in airflow in said metering passage.

5. A denier monitoring head assembly, comprising in combination:
   (a) a first member having a first surface,
   (b) means defining a groove in said first surface,
   (c) a removable cover member having a second surface mating with said first surface and spanning said groove to form therewith a restricted passageway for receiving a strand to be monitored,
   (d) a plurality of air distribution passages connecting spaced points along said passageway in common to a supply passage containing air at a pressure differing from atmospheric pressure,
   (e) and vent passages connecting to the atmosphere intermediate portions of said passageway between each adjacent pair of supply passages.

6. A denier monitoring head assembly, comprising in combination:
   (a) means having a plurality of axially aligned grooves in a surface, said grooves being separated by transverse air passages vented to the atmosphere,
   (d) a removable cover plate mating with said surface and spanning said grooves to form therewith a series of aligned restricted passageways for receiving a strand to be monitored,
   (c) and a distribution passage connecting an intermediate portion of each of said passageways with a supply passage containing air at a pressure differing from atmospheric pressure, whereby air flows through said passageways in parallel.

7. The monitoring head assembly defined in claim 5, wherein said removable cover member is formed of a material more readily deformable than the material of which said first member is formed.

8. A denier monitoring head assembly, comprising, in combination:
   (a) means defining a plurality of axially aligned passageways, both ends of each of said passageways communicating with the atmosphere,
   (b) a distribution passage connecting an intermediate point in each of said passageways to a common supply passage containing air at a pressure differing from atmospheric pressure,
   (c) and airflow detection means for responding to variations in air flow within said common supply passage.

References Cited by the Examiner

UNITED STATES PATENTS

| | | | |
|---|---|---|---|
| 2,014,998 | 9/1935 | Baguley et al. | |
| 2,407,100 | 9/1946 | Richardson. | |
| 2,516,932 | 8/1950 | Warnwright. | |
| 2,682,144 | 6/1954 | Hare. | |
| 2,707,389 | 5/1955 | Fortier | 73—37.5 |
| 2,718,140 | 9/1955 | Aller | 73—37.5 |
| 2,922,188 | 1/1960 | Bossen | 18—8 |
| 2,979,766 | 4/1961 | Briggs et al. | 18—8 |
| 3,154,810 | 11/1964 | Horne | 18—8 |

LOUIS R. PRINCE, *Primary Examiner.*

ISAAC LISANN, WILLIAM J. STEPHENSON, LEO SMILOW, *Examiners.*

FRANK H. THOMSON, *Assistant Examiner.*